United States Patent [19]
Sahasrabudhe

[11] 3,810,161
[45] May 7, 1974

[54] APPARATUS FOR RECEIVING A FREQUENCY AND PHASE CODED VEHICLE CONTROL SIGNAL

[75] Inventor: Arun P. Sahasrabudhe, Monroeville, Pa.

[73] Assignee: Westinghouse Electric Corporation, Pittsburgh, Pa.

[22] Filed: Mar. 15, 1973

[21] Appl. No.: 341,647

[52] U.S. Cl..... 340/170 R, 340/147 PC, 343/225 R
[51] Int. Cl. .............................................. H04q 9/00
[58] Field of Search ................... 340/170 R, 147 PC

[56] References Cited

UNITED STATES PATENTS 3,551,889 11/1967 Miller........................... 343/225 UX

*Primary Examiner*—Harold I. Pitts
*Attorney, Agent, or Firm*—J. M. Arnold

[57] ABSTRACT

A vehicle control signal, for example a vehicle speed command, is binary coded wherein the message content is frequency coded such that a binary one indication is at a first frequency and a binary zero indication is a second frequency. Timing information is phase coded, such that a shift in phase of a binary indication is indicative of a change from one bit to the next of the vehicle control signal. The vehicle control signal is received and is then shifted in phase an angular amount $\phi$. The received signal and the phase shifted signal are then multiplied together yielding a vehicle control signal proportional to Cos $\phi$. For each sensed change of frequency, or in the absence of a change of frequency a shift of phase, a timing pulse is provided. The message content of the Cos $\phi$ signal is also sensed, the sensed message is synchronized with the timing pulses to provide a synchronized vehicle control signal.

10 Claims, 4 Drawing Figures

APPARATUS FOR RECEIVING A FREQUENCY AND PHASE CODED VEHICLE CONTROL SIGNAL

CROSS REFERENCES TO RELATED APPLICATIONS

Reference is made to U.S. Pat. No. 3,551,889 entitled "REMOTE SIGNALING OF CONTROL SIGNALS" filed May 11, 1967 on behalf of C. S. Miller, and U.S. Pat. No. 3,562,712, entitled "REMOTE TRANSMISSION OF CONTROL SIGNALS" filed May 11, 1967 on behalf of G. M. Thorne - Booth et al. Each of the above named U.S. patents are assigned to the assignee of the present invention.

BACKGROUND OF THE INVENTION

In a vehicle control system wherein a binary coded vehicle control signal has binary 1 and 0 indications at first and second frequencies respectively and a phase shift at each bit time interval which serves as a timing reference, there is a requirement to receive the control signal accurately and to extract the timing reference for synchronizing the receiver.

In prior art systems, for example as illustrated in the reference patents, the timing reference is extracted on an amplitude dependent basis, that is the received signal is passed through a band pass filter, and the resultant envelope is detected. The null point in the envelope is considered the timing reference point. It is seen therefore that variations in signal amplitude in the receiver cause a resultant variation in the null point amplitude and in turn effects the recovery of the timing reference point.

According to the teachings of the present invention timing information is extracted from the vehicle control signal by sensing a frequency or phase change of the control signal, independent of the amplitude of the control signal.

SUMMARY OF THE INVENTION

According to the teachings of the present invention a signal receiving system is responsive to a provided binary coded message, wherein the message information is frequency coded and the timing information is phase coded. There are means for shifting the provided binary coded message in phase an angular amount $\phi$. Also included, are means responsive to the provided binary coded message and the shifted binary coded message for providing a binary coded message for providing a binary coded message proportional to Cos $\phi$. Further included are means responsive to the binary coded message proportional to Cos $\phi$ for detecting message information content and the timing information content therein.

DESCRIPTION OF THE PREFERRED EMBODIMENTS

Figure 1:
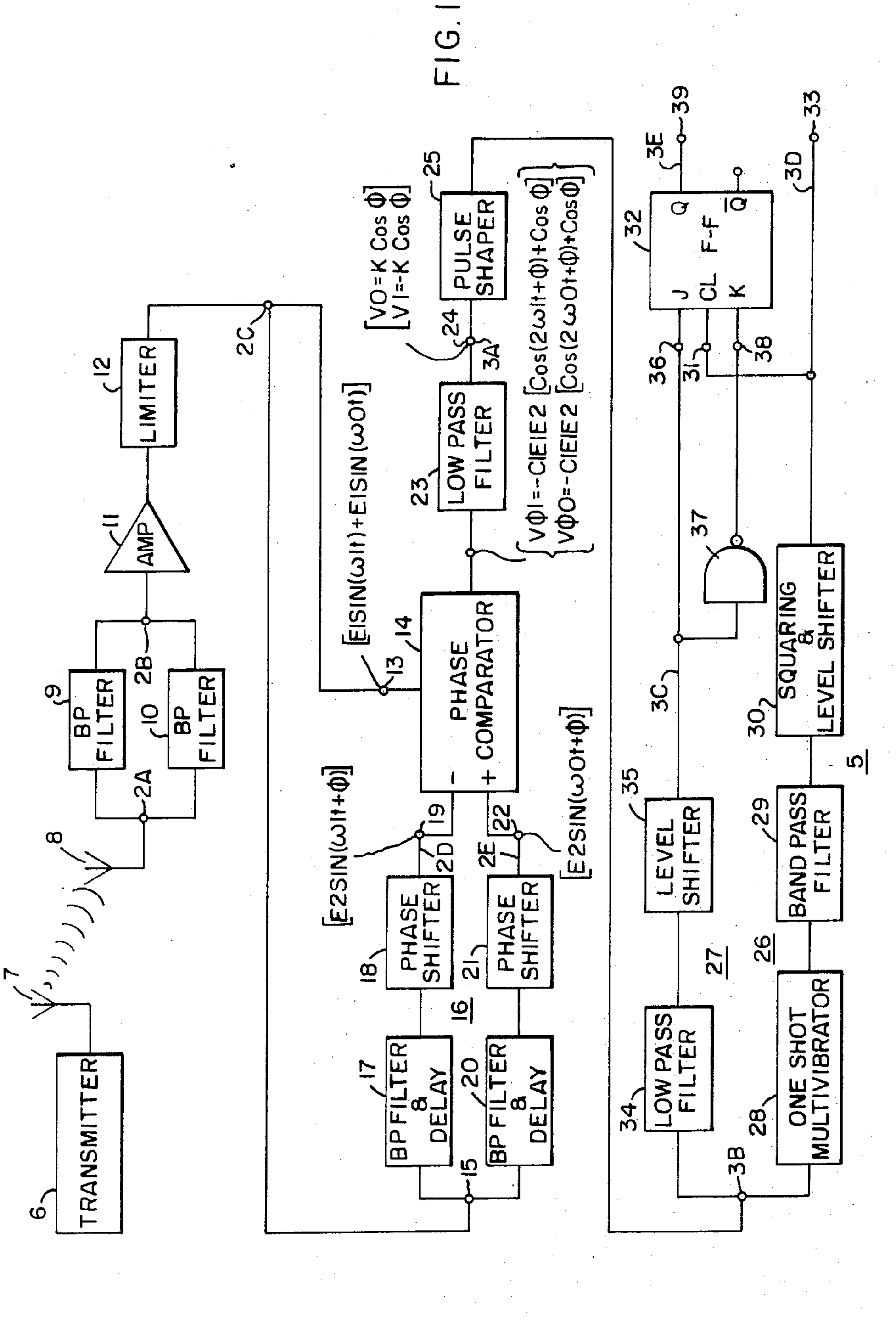
FIG. 1 is a block diagram representation of a signal receiving system embodying the teachings of the present invention.

In FIG. 1 there is illustrated signal receiving apparatus 5 which embodies the teachings of the present invention. A transmitter 6, which for example may form part of a signal transmitting system as illustrated in referenced U.S. Pat. No. 3,551,889, transmits a vehicle control signal by way of a transmitting antenna 7 to a signal receiving antenna 8 of the receiver 5. The received signal is a binary coded message wherein the binary one indications are represented by a first frequency, for example a relatively low frequency, and the binary zero indications are represented by a second frequency, for example a relatively high frequency.

Whenever there is a change from one bit time to the next there is a shift in phase of the received vehicle control signal to delineate the change in bit time. When there is a change from a binary one to a binary zero indication or vice versa, it is readily apparent that a change from one bit time to the next has occurred due to the frequency change. If however the binary indication stays the same from one bit time to the next, for example there is a binary one indication or a binary zero indication for two successive bit times, there is no way to ascertain the change from one bit time to the next without the incorporation of the phase shift. As will be seen shortly the detection of a frequency change or a phase shift in the received signal is used to extract a timing signal for synchronizing the receiver, and to provide a synchronized vehicle control signal at the output of the receiver.

Figure 2:
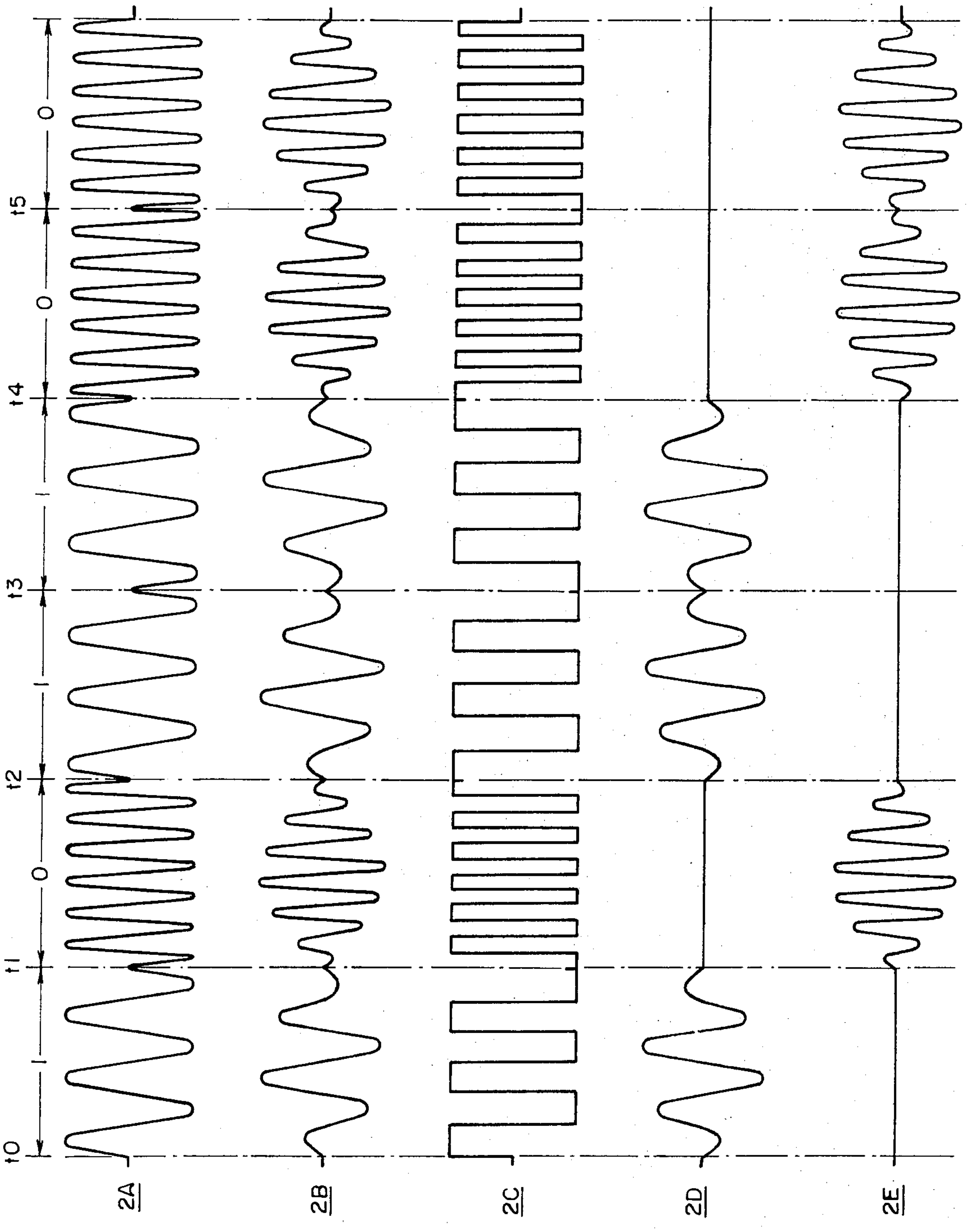
FIGS. 2, 3 and 4 are wave shape relationship diagrams which are useful in understanding the operation of the signal receiving system illustrated in FIG. 1.

Waveshape 2A of FIG. 2 illustrates the binary coded message which is received by the receiving antenna 8. Band pass filters 9 and 10 pass the binary 1 and binary zero portions of the received signal, respectively, to remove any noise and to achieve the necessary selectivity desired in the system (see waveshape 2B of FIG. 2). It is to be appreciated that the signals are delayed for a finite amount of time by the respective filters. It is also to be noted that the delays are different for each filter due to the different frequencies. These delays have not been illustrated for the sake of clarity in the drawings. These filters for example may be crystal filters. The signal appearing at the output of the filters 9 and 10 is amplified by an amplifier 11 which properly terminates input filters 9 and 10 and functions to control the sensitivity of the receiver. A signal limiter 12, such as a Schmidt trigger circuit with positive feedback, passes the signal from the amplifier 11. The limiter functions to limit the received signal amplitude to a known level. This reduces the sensitivity of the receiver to amplitude variations above the threshold of the limiter. The signal appearing at the output of the limiter 12 is illlustrated by waveshape 2C of FIG. 2.

The signal appearing at the output of the limiter 12 is provided to a first input terminal 13 of a multiplier such as the phase comparator 14 and to an input terminal 15 of a phase shifting network 16. The phase shifting network 16 shifts the binary coded message an angular amount $\phi$ which for example may be 180°. The binary one frequencies are passed by a band pass filter and delay network 17, which for example may be a mechanical filter such as a tuned cavity. The filter 17 also functions as a delay element. As is known in the art, the envelope delay through a band pass filter depends on the slope of the phase-frequency curve at the carrier frequency. The narrower the bandwidth the greater is the slope and accordingly the greater is the delay. This principle is used to achieve a shift in phase of the signal by an amount approximately equal to 90°, and a delay on the order of 10 milliseconds. There is a limit as to the amount of phase shift obtainable in the filter in order to maintain the band pass characteristic of the filter. The signal output of the filter 17 is passed by a phase shifter network 18, which for example may take the form of a RC delay network, for shifting the phase of the signal approximately another 90° such that the binary one signals which are applied to an inverting input terminal 19 of the phase comparator 14 are 180° out of phase with the binary one indications appearing at the input terminal 13. The signal appearing at the input terminal 19 is illustrated by waveshape 2D of FIG. 2. A band pass filter and delay network 20 and a phase shifter 21 respond to the binary zero indications of the signal from limiter network 12 in a like manner as the filter 17 and the phase shifter 18, respectively, respond to the signal output from the limiter 12. The phase shifted and delayed binary zero indications are applied to a non-inverting input terminal 22 of the phase comparator 14. The binary zero indication provided to the input terminal 22 are illustrated by waveshape 2E of FIG. 2. The signal delays manifested at the terminals 19 and 22 have not been illustrated for sake of clarity in the drawings.

The phase comparator 14 as was previously explained functions as a multiplier to multiply the signal appearing at the terminal 13 with the signals appearing at the terminals 19 and 22. The comparator 14 may for example take the form of a signetics NE565 integrated circuit omitting the voltage control oscillator. As was previously mentioned, the signal inputs to the comparator 14 from the phase shifting network 16 are two differential amplifier inputs. The equation of the signal appearing at the input terminal 13 is $E1SIN(wit)+F1SIN(wot)$ where $wit$ is the frequency of the binary one indications, and $wot$ is the frequency of the binary zero indications. The signal appearing at the inverting input terminal 19 is represented by the equation $E2SIN(-wit+\phi)$, and the equation representing the signal at the noninverting input terminal 22 is $E2SIN(wot+\phi)$. $\phi$ is the phase shift introduced by the network 16, and is substantially equal to 180°.

It is seen therefore that each binary one bit appearing at the input terminal 19 is 180° out of phase with the binary one signal appearing at the input terminal 13, and for each binary zero bit the signal appearing at the input terminal 22 is 180° out of phase with the binary zero indication appearing at the input terminal 13. This is the case for all instances of time for a received binary coded message, except when there is a phase reversal which is indicative of a change from one bit time to the next. At this time, there is a finite period when there is an in phase relationship between a signal appearing at the input terminal 13 and the terminal 19 or 22. The importance of this finite period when there is an in phase relationship will be discussed shortly.

The transfer function of the phase comparator 14 include a cosine function which is the phase difference between the input signals at the terminal 13 and 19, and the phase difference between the input signals at the terminals 13 and 22. As is known, if there is a zero degree phase shift between the two input signals the cosine of zero is +1. If however, there is 180° phase shift between the two input signals the cosine of 180° is −1. This feature is used to derive binary one and zero indications at the output of the phase comparator which have different polarities, that is the polarity of a binary one indication will be relatively positive and the polarity of a binary zero indication will be relatively negative.

Accordingly, there is a change in polarity of the output signal from the phase comparator 14 in response to a change in frequency from one bit time to the next which is indicative of a change in the binary indication of the signal, or in the event that the binary indication remains the same the phase comparator responds to the phase shift to produce a polarity change in the output signal for a relatively short time period which is indicative of a change in bit time. This is to be made more clear shortly. The equations of signal output from the phase comparator are as follows: The signal output for binary one signal indications are $V\phi 1=-C1E1E2[-Cos(2wit+\phi)+Cos\ \phi]$. For binary binary zero indications the equation for the signal output is $V\phi O=C1E1E2[Cos(2wot+\phi)+Cos\ \phi]$, where C1 is a proportionality constant of the phase comparator and E1 and E2 are the voltage amplitudes of the respective input signals. The signal output of the phase comparator 14 is filtered by a low pass filter 23 to remove the high frequency components of the signal from the phase comparator, that is the $Cos(2wit+\phi)$ and $Cos(2wot+\phi)$ components. It follows therefore, that the signal appearing at the output terminal 24 of the low pass filter 23 is $V1=-K\ Cos\ \phi$ for binary one indications, and $VO=K\ Cos\ \phi$ for binary zero indications, where $K=C1E1E2$.

Consider now the operation of the phase comparator 14 and the low pass filter 23 as they respond to the provided input signals. At a time to the signal from the limiter 12 is applied to the input terminal 13 of phase comparator 14 (see waveshape 2C of FIG. 2). The signal inputs to the input terminals 19 and 22 of the phase comparator 14 are illustrated by the waveshapes 2D and 2E respectively of FIG. 2. At the time to a binary one indication is applied to the terminal 13 and a 180° out of phase binary one indication is applied to the terminal 19. Since the signals are 180° out of phase the cosine of $\phi$ is −1 which is inverted to a + value by the comparater 14 since terminal 19 is an inverting input terminal. Therefore at the output terminal 24 of the low pass filter the signal is equal to $-K\ Cos(180°)=(-K)(-1)$ which equals a signal having a value of +K (see waveshape 3A of FIG. 3). This signal remains at the level +K until a time t1. At the time t1 a binary zero indication is provided to the input terminal 13 of the phase comparator 14 (see waveshape 2C of FIG. 2) and an 180° out of phase binary zero signal is provided to the input terminal 22 (see waveshape 2E of FIG. 2). Terminal 19 is absent a signal input at this time (see waveshape 2D of FIG. 2) since the binary indication has changed from a binary 1 to binary 0 that is, from a low frequency to a high frequency. The signal output from the low pass filter 23 at the terminal 24 is therefore K Cos (180°) which equals −K, which is a binary zero indication (see waveshape 3A of FIG. 3). At a time *t2* a binary one indication is applied to the input terminal 13 and a 180° out of phase binary one signal is applied to the input terminal 19. The input terminal 22 is absent a signal input at this time. The signal output from the low pass filter 23 therefore is an output signal equal to +K, which is indicative of a binary one signal.

Figure 4:
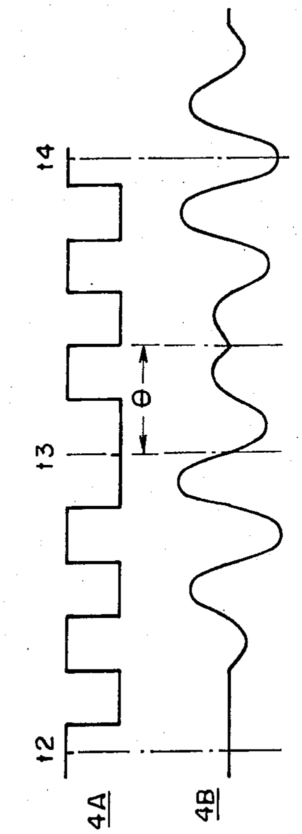

At a time *t3* there is no change in the frequency but there is however the usual phase shift which is indicative of the change in bit time interval. For a brief instance of time $\theta$ when this phase shift occurs the signals appearing at the terminals 13 and 19 are in phase. Since this is the case, the signal appearing at the output terminal 24 equals −K Cos(0°) which equals −K. It is to be noted that this is the signal level for a binary zero indication. The signal returns to a +K level for the remainder of the bit time interval, after the interval $\theta$. This is more clearly seen in relation to FIG. 4, where the waveshape 4A corresponds to the waveshape 2C of FIG. 2 for the time interval from $t3$ through $t4$ and waveshape 4B corresponds to the waveshape 2D of FIG. 2 for the same time interval. The delay of the binary one indications in network 17 is illustrated in waveshape 4B, whereas it wasn't illustrated in waveshape 2D for the sake of clarity. This delay accounts for the in phase relationship mentioned above. It is seen that at the time $t3$ with reference to waveshape 4A that the signal appearing at terminal 13 is of a relatively low value. The signal appearing at terminal 19 as illustrated by waveshape 4B of FIG. 4 switches from a positive level, which is out of phase, to a negative level, which is in phase, then to a positive level, which also is in phase, and then back to an out of phase signal level after the time period $\theta$. It is seen that for the finite period of time $\theta$ illustrated in FIG. 4B that the waveshapes 4A and 4B are in phase, that is there is a zero degree phase difference for this time period. Accordingly, a negative going signal is provided at the output of low pass filter 24 which is indicative of the change from one bit time to the next. However, at the expiration of the time period $\theta$ the 180° out of phase relationship returns and the signal output from the low pass filter 24 returns to a +K level, which is indicatve of a binary one indication for this bit time interval.

At the time $t4$ a binary zero indication is present at the input terminal 13 as is a 180° out of phase binary zero indication present at the input terminal 22. The phase comparator and low pass filter respond to this condition to provide a −K or binary zero indication at the output of the low pass filter. At a time t5 the binary zero indication is still present at the input terminals 13 and 22. Therefore, the phase comparator senses the phase change in like manner as time T3, and a signal of +K is provided at the output of filter 23 for a finite period $\theta$, and the signal then returns to a −K level indicative of a binary zero indication for the remainder of the bit time interval.

It is seen therefore that for each change in frequency at the input of the comparator, which is indicative of a change in bit time interval, a corresponding change in output signal level occurs at the output of the low pass filter 23. In the absence of a frequency change, and in the presence of a phase change at the input of the comparator a change in signal level occurs for a short time interval $\theta$ at the output of the low pass filter, which is also indicative of a change from one bit time to the next.

Figure 3:
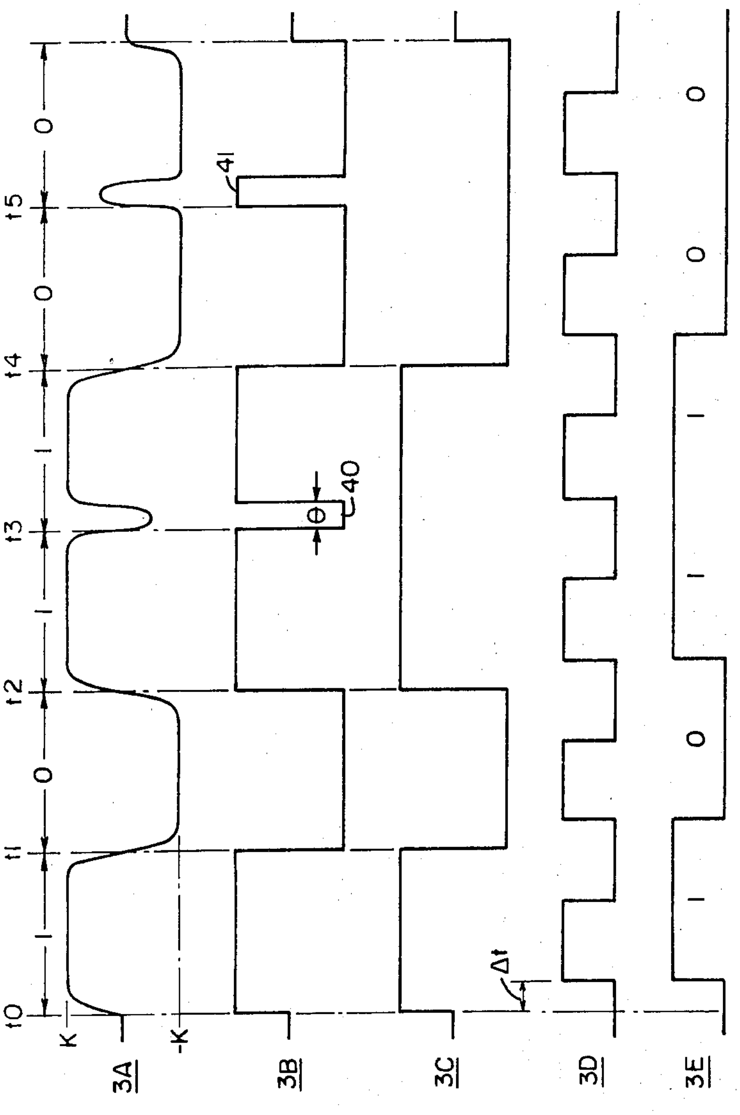

The signal output from the low pass filter 23 is then processed by a pulse shaper 25 which provides a substantially rectangular waveshape at its output, which is in phase with the output signal from the low pass filter 23 (see waveshape 3B of FIG. 3). The signal from the pulse shaper 25 is concurrently applied to a timing recovery network 27. The timing recovery network 26 is comprised of a one shot multivibrator 28, a bandpass filter 29 and a squaring and level shifter network 30. The network 26 functions to recover the timing information from the ±K Cos $\phi$ signal. This timing information is indicative of the respective changes from one bit time interval to the next. One shot multivibrator 28 is a multivibrator which responds to either the leading of the lagging edge of an applies signal to switch to its unstable state. As is known, the one shot multivibrator then returns to its stable state a predetermined amount of time later, which is determined by the time constant of the multivibrator. The signal applied to the input terminal of the one shot multivibrator 28 is illustrated by waveshape 3B of FIG. 3. At the time $t$0 the leading edge of the waveshape 3B is applied to the input of the multivibrator 28, switching it to its unstable state. A predetermined amount of time later, the multivibrator then returns to its stable state. The signal output of the multivibrator 28 is then passed by a bandpass filter 29 which is responsive to signals at the desired timing frequency, and which delays the signal for a time period $\Delta t$. The resultant output pulses occur substantially at the midpoint of a bit time interval. The signal output from the filter 29 is then passed by a squaring and level shifter network 30. The resultant square wave output is then applied to the clock terminal 31 of the J-K flip flop 32, as well as to an output timing terminal 33 (see waveshape 3D of FIG. 3). At the time t1 the input to the one shot multivibrator is the lagging edge of a pulse which is indicative of the pulse of the change of from one time interval to the next and the one shot multivibrator once again switches to its unstable state. The same condition occurs at the time t2. At the time $t3$ there is a lagging edge of a pulse which is indicative of a change from one bit time to the next, and the one shot multivibrator 28, switches to its unstable state. After a period of time $\theta$ a leading edge is applied to the multivibrator, but this switch in signal level has no effect on the multivibrator as it is still in its unstable state. This is so since the timing interval of the monostable multivibrator is longer in duration than the time period $\theta$. It is seen therefore, that the leading edge after the time period $t3+\theta$ has no effect on the multivibrator. It is seen therefore that the multivibrator responds only to the first edge of a pulse produced in response to a phase change. The following timing pulses then are provided in a like manner at the times $t$ 4 and $t5$.

The message recovery circuit 27 is comprised of a low pass filter 34 and a level shifter 35. The signal output of the pulse shaper 25 is applied to the input of the low pass filter 34. This is done to filter out high frequency components 40 and 41 as illustrated by waveshape 3B of FIG. 3. It is to be remembered that these indications were generated in response to a phase shift at the input of the phase comparator 14 in the absence of a frequency change, that is there was a change in bit time but no change in binary level indications. That is, the binary indication remained the same from one bit time to the next. The filtered signal is then passed to the level shifter network 35 and at the output thereof a waveshape is provided that is illustrated by waveshape 3C of FIG. 3. This signal then has to be synchronized with the timing pulses from the timing recovery unit 26. This signal is applied to the J input terminal 36 of the flip flop 32, and to the input of an inverting network 37 and from there to the K input of the flip flop 32. The flip flop 32 therefore provides a binary one indication at the output terminal 39 in response to a timing pulse being applied to clock terminal 31 concurrent with a positive signal indicative of a binary one signal being applied to the J terminal 36. Likewise a binary zero indication is provided at the output terminal 39 in response to a timing pulse being provided to clock terminal 31 concurrent with a positive level indicative of a binary zero indication being applied to the K terminal 38. This is readily seen in relation to the waveshapes 3C, 3D and 3E as illustrated in FIG. 3B. The synchronized vehicle control signal appearing at the terminal 39 (see waveshape 3E of FIG. 3) and the timing signal appearing at the terminal 33 (see waveshape 3D of FIG. 3) may be connected to appropriate decoding apparatus, which for example may sense selected speed codes for controlling a vehicle. Such decoding networks are illustrated in FIG. 2 of previously referenced U.S. Pat. No. 3,562,712.

In summary a signal receiving system has been disclosed which is responsive to a provided binary coded message wherein the message information is frequency coded and the timing information is phase coded. The provided binary coded message is shifted in phase an angular amount equal to $\phi$. There are means responsive to the provided binary coded message and the shifted binary coded message for providing a binary coded message proportional to Cos $\phi$. For each sensed change in frequency or in the absence of a change in frequency, a shift in phase a timing signal is provided. The message content of the signal proportional to Cos $\phi$ is also sensed and synchronized with the timing signal to provide a synchronized vehicle control signal.

What I claim is:

1. In a signal receiving system responsive to a provided binary coded message, wherein the message information is frequency coded and the timing information is phase coded, the combination comprising:

means for shifting said provided binary coded message in phase an angular amount $\phi$;

means responsive to said provided binary coded message and the shifted binary coded message for providing a binary coded message proportional to Cos $\phi$ and means responsive to said binary coded message proportional to Cos $\phi$ for detecting the message information content and the timing information content therein.

2. In a signal receiving system, the combination comprising:

means for providing a binary coded message, wherein the message content is frequency coded and the timing content is phase coded;

means for providing a binary coded message shifted in phase an angular amount $\phi$ in response to the provision of said binary coded message;

means responsive to the concurrent provision of said binary coded message and said binary coded message shifted in phase an angular amount $\phi$ for providing a binary coded message proportional to Cos $\phi$; and means responsive to said binary coded message proportional to Cos $\phi$ for decoding same to provide a first signal indicative of the message content therein, and a second signal indicative of the timing content therein.

3. In a signal receiving system, the combination comprising:

means for providing a first coded message having message content and timing content;

means for delaying said first coded message for providing a second coded message;

means for providing a third coded message in response to multiplying said first coded message with said second coded message;

means responsive to the provision of said third coded message for detecting the message content therein; and means responsive to the provision of said third coded message for detecting the timing content therein.

4. In a signal receiving system responsive to a provided binary coded message, wherein the message information is frequency coded such that a binary ONE indication is at a first frequency and a binary ZERO indication is at a second frequency, and the timing information is phase coded such that a shift in phase of a binary indication is indicative of a change from one bit time to the next, the combination comprising:

means responsive to the provision of said provided binary coded message for shifting same in phase an angular amount $\phi$;

means responsive to the provision of said binary coded message and the shifted binary coded message shifted in phase an angular amount $\phi$ for providing a binary coded message proportional to Cos $\phi$;

means responsive to each shift in phase of a binary indication for providing a timing signal;

means responsive to said timing signal and each binary indication in said binary signal coded message proportional to Cos $\phi$ for detecting the message information in said binary coded message proportional Cos $\phi$.

5. In a signal receiving system responsive to a provided binary coded message, wherein the message information is frequency coded such that a binary ONE indication is at a first frequency and a binary ZERO indication is at a second frequency, and the timing information is phase coded such that a shift in phase of a binary indication is indicative of a change from one bit time to the next, the combination comprising:

means responsive to the binary ONE indications in said provided binary coded message for shifting the binary ONE indications an angular amount $\phi$;

means responsive to the binary ZERO indications in said provided binary coded message for shifting the binary ZERO indications an angular amount $\phi$;

means responsive to the shifted binary ONE and ZERO indications and the provided binary coded message for providing a binary coded message proportional to Cos $\phi$;

means responsive to either a shift in phase or a change in frequency for providing a timing signal;

means responsive to the provision of said binary coded message proportional to Cos $\phi$ for detecting the message content therein; and means responsive to the concurrent provision of the detected message content of said binary coded message proportional to Cos $\phi$ and said timing signal for providing a decoded message synchronized with said timing signal.

6. The combination claimed in claim 5 wherein the last named means comprises a bistable device.

7. In a system for receiving coded vehicle control signals, the combination comprising:

means for providing a binary coded vehicle control signal wherein the message content is frequency coded and the timing content is phase coded;

means for shifting said binary coded vehicle control signal an angular amount $\phi$;

means for providing a binary coded vehicle control signal proportional to Cos $\phi$ in response to the concurrent provision of said provided binary coded vehicle control signal and the shifted binary coded vehicle control signal; and means for providing a decoded vehicle control signal in response to the provisions of said binary coded vehicle control signal proportional to Cos $\phi$.

8. The combination claimed in claim 7 including:

means for providing a timing signal in response to sensing a phase shift.

9. The combination claimed in claim 8 including:

means for providing a synchronized vehicle control signal which is synchronized with said timing signal, in response to the provision of said decoded vehicle control signal and said timing signal.

10. In a signal receiving system responsive to a provided binary coded vehicle control message, wherein the message information is frequency coded such that a binary ONE indication is at a first frequency, and a binary ZERO indication is at a second frequency, and the timing information is phase coded such that a shift in phase of a binary indication is indicative of a change from one bit time to the next, the combination comprising:

means responsive to said provided binary coded vehicle control message for shifting same in phase an angular amount $\phi$;

means responsive to the provision of said provided binary coded vehicle control message and the phase shifted binary coded vehicle control message for providing a binary coded vehicle control message proportional to Cos $\phi$;

means responsive to each shift in phase of a binary indication for providing a timing signal; and means responsive to said timing signal and each binary indication in said binary coded vehicle control message proportional to Cos $\phi$ for detecting the message information therein.

* * * * *